United States Patent [19]

Fisher

[11] Patent Number: 4,457,494
[45] Date of Patent: Jul. 3, 1984

[54] METAL MELTING FURNACE

[76] Inventor: Roy Fisher, 409 - 595 River Ave., Winnipeg, Manitoba, Canada, R3L 0E6

[21] Appl. No.: 460,070

[22] Filed: Jan. 21, 1983

[30] Foreign Application Priority Data

Jan. 21, 1982 [GB] United Kingdom ............... 8201700

[51] Int. Cl.$^3$ ............................................. F27B 14/02
[52] U.S. Cl. .................................... 266/140; 266/144; 266/205; 266/901; 75/63
[58] Field of Search ............... 266/140, 144, 205, 900, 266/901; 75/445, 63, 68 R, 65 R

[56] References Cited

U.S. PATENT DOCUMENTS

3,468,524  9/1969  Haack .............................. 266/205
3,984,090 10/1976  Swartz ............................. 75/445

*Primary Examiner*—M. J. Andrews
*Attorney, Agent, or Firm*—Stanley G. Ade

[57] ABSTRACT

A refractory lined melting furnace particularly suited for separation of non-ferrous metals with embedded or attached ferrous components, includes a casing or body pivotally mounted and tiltable by means of fluid operators. The interior is divided by two vertical walls into a combustible waste burning portion for the generation of combustible gases to assist in heating the furnace, and a melt chamber into which a variety of metallic waste can be charged for melting. A conventional fire burner is supplied to the melt chamber. The temperature of the melt chamber is raised to the melting point of the metallic waste material having the lowest melting point, e.g. aluminum, and when the aluminum is melted, the aluminum runs through drainage apertures into a liquid metal holding chamber provided on the floor of the melt chamber. When the molten metal has drained, the furnace is tilted rearwardly to discharge the remaining scrap out through rake-out doors at the rear of the melt chamber. The sequence is repeated with heat being supplied from the combustible gases formed in the combustible waste burning portion, until the storage chamber is full whereupon the furnace is tilted and the molten metal discharged from a tapping hole in the front of the storage chamber.

25 Claims, 6 Drawing Figures

METAL MELTING FURNACE

BACKGROUND OF THE INVENTION

This invention relates to new and useful improvements in metal melting furnaces particularly suited to the melting and separation of non-ferrous metals with embedded or attached ferrous components.

It is normally difficult to separate ferrous and non-ferrous components because of the relatively large volume of scrap which must be charged into a furnace which is then heated to the melting point of the material having the lowest melting point, whereupon this melted material is then poured from the furnace and the remainder of the scrap is removed from the furnace and the whole process is again repeated.

In this invention the final configuration of components is established by specific end use. However, the principles of operation remain the same; that is the invention raises the temperature of combustion of pyrolysis gas, by countercurrent heating of this gas and fresh air supply, by waste heat from a combustion chamber or chambers, such that the raised heating effect in the combustion chamber or chambers is significantly improved, while the exhaust gas heat loss is significantly minimized effecting improved thermal efficiency of operation, and by virtue of the temperatures obtained, broadens the scope of application of the device, even to pollution control afterburner service requirements, all functions essentially completed within the aforesaid configurations.

In the following, two specific but non-exclusive uses of the principle of operation receive, more or less, detailed explanation, subject of previous evidence namely, the application of the raised heating effect to melt and-/or recover ferrous or non-ferrous metals from scrap utilizing mainly/only the thermal energy obtainable from combustible waste materials and again, the heating of pressurized water to above or below steam generation point for such a process and space heating functions.

Due to the relatively small percentage of low melting point material in normal scrap, the conventional system is expensive and time consuming particularly in view of the fact that, for example, melted aluminum must be removed immediately from contact with ferrous components in order to avoid contamination of the aluminum.

An example of such scrap that might be utilized and, in fact, often is utilized for this purpose, is pistons, piston rings and connecting rods together with the wrist pins attaching the pistons to the connecting rods.

The present invention overcomes these disadvantages by providing a melting furnace together with a source of burner fuel and comprising in combination a main body, means mounting said body for fore and aft tilting action, vertically situated dividing walls in said body defining the interior thereof into a melt chamber and a combustible gas producing pyrolysis chamber, a separate liquid metal holding chamber within said melt chamber, an exhaust gas cleaning chamber, means communicating between said melt chamber and said holding chamber adjacent the front upper side of said holding chamber, a burner assembly for said melt chamber and a further burner assembly for said holding chamber, means operatively connecting said combustible gas producing chamber with said first mentioned burner assembly on a selective basis, exhaust means for said furnace communicating between said melt chamber, said holding chamber and said exhaust gas cleaning chamber, a separate charging door for said melt chamber, and said holding chamber and a metal tapping hole in said holding chamber and selectively communicating through the wall of said main body.

Another aspect of the invention is to provide means whereby combustible waste can be heated to a predetermined temperature to produce combustible gases which can be used in assisting in the firing of the main melt chamber burner and the metal holding chamber burner thus reducing the cost of operation of the device by conventional fuels.

Still another aspect of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
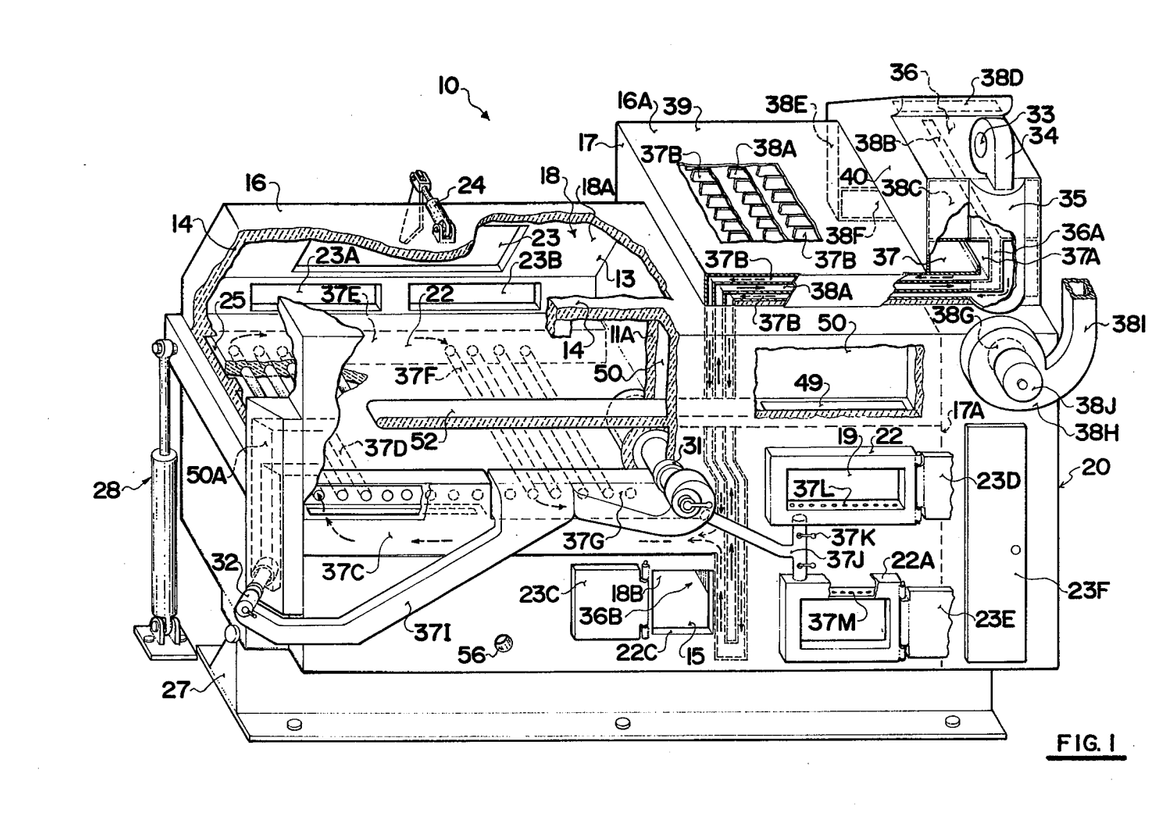
FIG. 1 is a partially cut-away oblique view of the metal melting furnace with sections of the upper side removed for clarity.

Proceeding therefore to describe the invention in detail, the furnace comprises a substantially rectangular body when viewed in plan and collectively designated 10.

It consists of front walls 11, side walls 12 and a rear wall 13 and these walls are manufactured preferably of steel and are covered internally, where necessary, by refractory material shown schematically by reference character 14, said refractory material being conventional in installation and attachment so that it is not believed necessary to describe same further.

The upper floor designated 22 is of refractory material and is supported by stainless steel flues designated 37D and 37F.

The interior walls 17 and 17A extend from the front wall 11 to the rear wall 13 between the base or floor 15 and the roof 16 divides the furnace into three main chambers, namely a main melt chamber collectively designated 18, a combustible gas generating chamber designated 19 and an exhaust cleaning chamber designated 20.

Figure 1A:
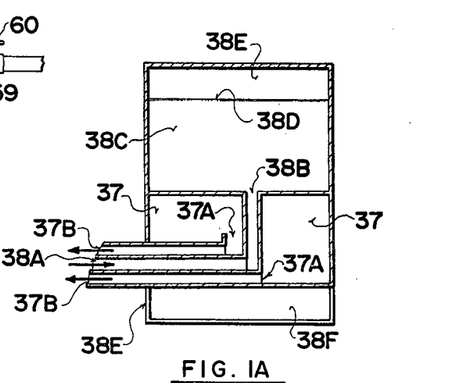
FIG. 1A is a fragmentary cross sectioned front elevation of the minor chamber per se.

A fourth minor chamber designated 40 is located above the exhaust cleaning chamber 20 and is defined on its underside by the roof 16A. This chamber 40 subdivides into three compartments, namely an upper exhaust diffusion chamber designated 36A and two air inlet chambers both designated 36.

Situated within the main melt chamber 18 and defined by the upper side of the floor 22 and the roof 16 is a metal melt chamber designated 18A. Also situated within the main melt chamber and defined by the underside of the floor 22 and the refractory lined floor 15 is located a liquid metal holding chamber designated 18B.

The only passage between the upper melt chamber 18A and the lower liquid metal holding chamber 18B is a plurality of apertures designated 25 extending downwardly through the floor 22. The apertures 25 serve both as the flue gas exhaust and liquid metal drainage ports communicating between the upper melt chamber 18A and the lower liquid metal holding chamber 18B.

A metal charging door designed 23 is activated by the fluid operator 24 located in the upper sloped section of the rear wall 13 of the melt chamber 18A. Rake-out doors 23A and 23B are located below the metal charging door 23 in the lower vertical section of the wall 13. These rake-out doors 23A and 23B are utilized for the removal of charged foreign matter and metals of a higher melting temperature than that of the desired liquid load that drains into the liquid metal holding chamber 18B.

A charging door 23C located in the front wall 11 communicating with the metal holding chamber 18B permits the charging of clean metal directly to this holding chamber 18B.

A loading door 23D is located in the front wall 11 that permits the loading of combustible waste to the combustible gas generating chamber designed 19.

An ash clean-out door 23E is located in the wall 13 below the combustible waste loading door 23D.

A door designated 23F permits entry to the exhaust cleaning chamber 20. This exhaust cleaning chamber 20 is in effect, a bag house for removal of dust fines before their entry to the exhaust outlet fan designated 38H.

To initiate the generation of combustible gas in the combustible gas generating chamber 19, a few pieces of waste material are simply ignited therein. When the temperature within the combustible gas generating chamber 19 reaches a certain intensity, waste materials such as old tires, break down by pyrolysis action into highly combustible gases. The air inlet to the combustible gas generating chamber 19 is through a plurality of small apertures 37M communicating with the interiors of the said hollow door frames 22A.

The combustible gas generated by pyrolysis action in the combustible gas generating chamber 19 breaks into limited flame in the proximity of the air inlet apertures 37L and 37M. The flame thus generated is suffocated at a level slightly above and slightly to the rear of the air inlet apertures 37L by the very dense combustible smoke generated in the waste chamber 18. The above desired condition is accomplished by limiting and controlling the air supply by the control dampers 37K located in the branch duct 37J.

The pyrolysis gas thus generated is ducted through the opening designated 49 and on through the ducts designated 50 and 50A respectively, supplying the main fuel burner designated 31, firing the upper melt chamber 18A, also supplying a minor fuel burner designated 32 firing the lower holding chamber 18B.

Additional heat is supplied to the holding chamber 18B by the flow of the exhaust heat from the upper melt chamber 18A through the apertures designated 25 communicating between the melt chamber 18A and the lower holding chamber 18B.

During the warm-up period the pyrolysis gas to the fuel burner 31 and 32 is assisted by conventional fuels such as propane, natural gas or electricity. Conventional fuels are also utilized prior to any furnace shutdown to burn out all carbon accumulation in the combustible gas generating chamber 19 and in the pyrolysis gas ducts 50 and 50A en route to the fuel burners 31 and 32, otherwise air polluting gases will continue to exude for a considerable time from around doors and the exhaust outlet, etc.

The bottom of the pyrolysis gas duct 50 communicating with the gas generating chamber 19 by means of the aperture 49, defines the upper side of a refractory divider designated 52, dividing the duct 50 into an upper and lower section. The divider 52 serves as a bridging in support of the refractory walls 11 and 11A defining the side walls of the duct 50.

The main purpose of this refractory divider is to increase the length and area of surface contact of the pyrolysis gases passing through the aperture 49, with the extremely hot face of the highly conductive refractory wall 11A of the melt chamber 18A that is common to the pyrolysis gas conveying duct 50.

The superheated pyrolysis gas is conveyed through duct 50 to the main burner 31 firing the melt chamber 21 through the branch duct 50A to the fuel burner 32 firing the liquid metal holding chamber 18B.

Figure 3:
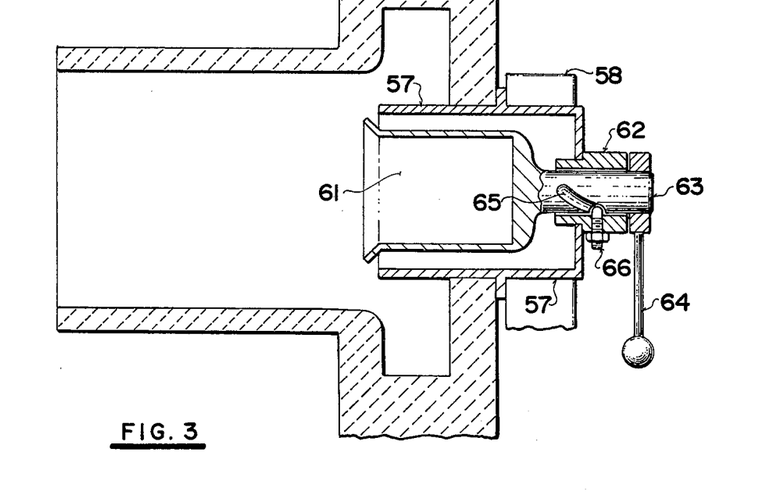
FIG. 3 is a longitudinal cross sectional view of one of the burner assemblies per se.
Figure 3A:
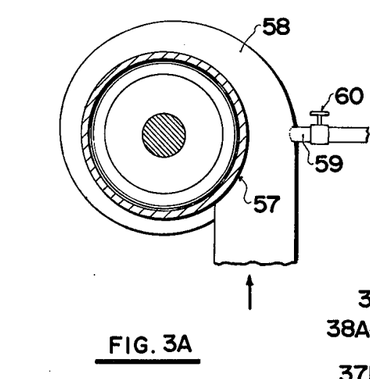
FIG. 3A is a partial end view of FIG. 3.

Details of the construction of the burner assemblies 31 and 32 are given subsequently (FIGS. 3 and 3A).

The exhaust from the furnace is through the exhaust port 36B communicating with the exhaust outlets 38 positioned in the vertical inner side and top upper side of the exhaust duct designated 38A (FIG. 1).

The lower portions of the ducts 38A extend from the duct outlets 38 transversely within the dividing wall 17 to the rear wall 13 and vertically to the underside. The exhaust duct 38A then rises vertically to a position centred between the roofs 16 and 16A. The exhaust gases are then carried horizontally and upwardly through the exhaust outlet 38B to the exhaust gas diffusion chamber 36A, on through the opening 38D, the duct 38E, the opening 38F, the exhaust cleaning chamber 20, and on through the exhaust fan inlet 38G, the fan 38H and finally through the exhaust outlet 38I. The motor powering the exhaust fan 38H is of a variable type in order that the capacity of exhaust fan motor 38J can be varied.

Not shown is a hooded section at the front of the combustible gas generating chamber 19. The purpose of the hood is to trap any smoke leakage that may occur when either the combustible waste charging door 23F or the ash clean-out door 23E are opened.

The hooded section communicates with the intake 33 of the air supply fan designated 34. Thus any smoke trapped is passed to the burners 31 and 32 and consumed.

The air is ducted through inlet 33 to the air supply fan 34. The air fan 34 propels the air through the transition ducts 35 to the air diffusion chambers 37.

The air is then propelled through the air diffusion chambers 37 and outlets 37A to the air ducts 37B positioned around the exhaust ducts 38A.

The air outlets 37A communicating with the air ducts 37B define the beginning of the heat exchanger system designated 39.

The air ducts 37B totally encase the upper and lower sides of the exhaust duct 38A and the exhaust ports 36B that communicate with the metal holding chamber 18B.

The air supply ducts 37B connect with a duct 37C and consecutively with air flues 37D, the rear manifold 37E, the return air flues 37F, the front manifolds 37G and the ducts 37H and 37I, supplying the air for cumbustion to the major burner 31 and the minor burner 32.

The air supplied to the main burner 31 firing the melt chamber 18A and the minor burner 32 firing the holding chamber 18B is superheated, the result of the inner surfaces of the air conveying ducts 37C, 37E and 37G and the outer surfaces of the interconnecting air supply flues 37D and 37F being in contact with the extremely but refractory floor 22 and walls 11 and 13 in which they are embedded.

An important aspect is the heat exchanger system 39, whereby the exhaust duct 38A (extending between the furnace exhaust inlet 38 and its outlet 38B in the diffusion chamber 40) gives up approximately 90% of the exhaust heat to the incoming air being ducted in a reverse direction through the surrounding air ducts 37. Thus 90% of the waste heat is returned to the furnace and is recycled through the air system to the furnace.

The furnace body is mounted on trunions 27 (one only being shown) forwardly of the transverse axis thereof, said trunions being supported on a supporting surface such as a foundry floor.

Fluid operators 28 extend upwardly from the supporting surface, and are pivotally secured to each side adjacent the rear side 13 to the side wall support beams 26 on the end walls 10 and 12. The fluid operator on the right hand side (10) of the furnace is not shown.

In summary, the superheated air and superheated pyrolysis gas is brought near the ignition point of the pyrolysis gas prior to their entry to the burner whereupon, on entry to the extremely hot surface of the burner ports, they fire spontaneously.

It should be noted that the capacity of the exhaust fan 38H is substantially greater than that of the air fan 34 and that the volume of gases moved by exhaust fan 38H is controllable by a variable speed motor designated 38J.

This means that a slight negative pressure can be set up within the entire body portion thereby preventing fumes and/or flames from escaping through any of the doors or the like.

At the same time when it is desired to open the charging doors 23, the speed of the exhaust fan 38H can be increased considerably thus causing an air barrier just inwardly of the doors 23 due to the movement of exhaust gases through the exit apertures 25 as hereinbefore described.

In operation, combustible waste material is loaded into chamber 19 to raise the temperature thereof. Metallic scrap of various types is then loaded into the melt chamber 18A through door 23.

Once sufficient temperature has developed in the burner assemblies as will hereinafter be described, the conventional source of fuel may be reduced or cut-off altogether and combustion can continue by means of combustible gases entering the burner assemblies 31 and 32 via conduits 50 and 50A from chamber 19.

The temperature within the melt chamber is raised to just above the melting point of the metal component of the scrap having the lowest melting point. For example, if aluminum is the lowest melting point material then the temperature is raised so that all of the aluminum within the scrap is melted. The metal drains through the apertures 25 to the molten metal storage regardless of the position of the furnace.

When this metal has completely transferred, the furnace is tilted rearwardly and rake-out doors 23B are opened thus enabling the remainder of the scrap to be ejected and raked from the melt chamber whereupon a further charge can be inserted and the process repeated until the storage chamber 18B is full or all of the scrap has been treated.

At that time, a tapping hole 56 may be opened, the furnace tilted forwardly and the molten metal poured from the storage chamber 18A via the tapping hole 56.

Inasmuch as the tapping hole 56 is conventional, it is not believed necessary to describe same further except to comment that it communicates through the front wall 11 of the body with the intgerior of the storage chamber 18A.

FIGS. 3 and 3A show details of the burner assemblies which consist of an annular casing 57 acting as a rear burner sleeve having an annular casing 58 eccentrically secured to the rear thereof to form a venturi inlet for air passing through ducts 37H and 37I as hereinbefore described.

The conventional fuel supply, either gas or oil, enters the annular duct 57 through nozzle assembly 59 controllable by valve 60 so that a mixture of fuel and air enters the annular body 57 in a well mixed and spiralling helix configuration with considerable centrifugal force between the annular casing 58 and an adjustable inner sleeve 61 havng an outwardly flared end extending forwardly of the end of the burner sleeve 57.

It enters a rear retort chamber 58A and is fired through the lighting port through a wick. It then passes to a front retort portion 59A connected by a connecting duct 60A and the combustible gases enter the burner assembly via duct 50, and into the duct 60A.

It is normal for the fuel burners 31 and 32 to be fired by conventional fuel and when the melting and holding chambers 18A and 18B are sufficiently heated and the front retort area 59A of the burner is in brilliance, the combustible gases pass to the main burner 31 and minor burner 32 where they are instantly ignited. When good ignition is assured the conventional fuel supply is turned off and the furnace is now controlled by the adjustments of the air supplies of the burners 31 and 32.

This is accomplished by movement of the cylindrical sleeve 61 journalled within a bushing 62 at the rear of the burner chamber body 57. The sleeve 61 is supported upon a shaft 63 and is rotatable manually by means of handle 64. A spiral groove 65 in the wall of the shaft 63 is engaged by a pin 66 so that rotation of handle 64 moves the sleeve forwardly or rearwardly within the burner body 57. As the sleeve is moved forward more air is forced between the diverged end on the inner sleeve therefore increasing the aspirating effect and drawing more pyrolysis gas from the pyrolysis gas generating chamber. As the diverging end of the sleeve is withdrawn toward the edge of the burner body 57, the volume of air and aspirating effect is reduced which in turn reduces the quantity of pyrolysis gas being drawn by the diverging air wall. This burner is then focused into a refractory lined retort and on into the melt chamber. When the temperature of the retort, the pyrolysis gas and the super heated air are suitably conditioned, the result is a smokeless exhaust.

Features of the present invention include the following:

An important feature of the furnace design is in the use of the relatively powerful exhaust system which, by using a high capacity exhaust fan along with an amply sized duct and manifold system, creates a pressure level below atmospheric in all areas of the furnace thereby preventing any outward leakage of flame or gases around the doors or burner parts.

Also of importance is the arrangements that prevent an outflow of heat or gas when the charging doors 23 are open to receive a metal charge or to remove scrap from the melt chamber 19.

The exhaust fan 38H is then operated to maximum capacity creating an inflowing air wall by the air being drawn in through the exhaust outlets within the open area of the charging doors. When these doors are closed, the exhaust fan capacity is reduced so that the pressure within the entire furnace is held at a pressure level only slightly below atmospheric pressure. In this way the heat flow through the heat and heat exchanger system is slowed for maximum efficiency.

Another important feature of the design is that the heat supply generated by the burner 31 in the melt chamber 18A is at its greatest intensity within the chamber 18A which, after giving up heat in the melting process, is passed to the lower holding chamber 18B at a more moderate temperature more suited to the holding requirements of this chamber where oxidation loss by overheating is a factor. The minor burner 32 generates additional heat when required.

Another feature of the design is that the lower holding chamber 18B can be loaded to capacity with liquid metal without interfering with the melting of the non-ferrous metals and the emptying of unwanted ferrous components.

When tilted rearwardly for emptying of unwanted ferrous components and reloading of scrap, the molten metal is held in a well formed between the roof and floor of the holding chamber 18B and this feature permits a relatively large accumulation of liquid metal that, by varying the charge, can be brought to a desired analysis. When the holding chamber is loaded to capacity, the whole load is tapped off and is of a uniform analysis.

Finally, it should be stressed that a great deal of the heat required to operate this furnace can be derived from industrial scrap, waste, or even garbage which is readily available thus reducing the overall energy requirements of conventional fuels. Of course, it will be appreciated that the generation of combustible gases by this method can be utilized in other environments than furnaces, such as steam for electric generating plants, etc. The process herein developed could be utilized for dehydrating plants such as for garbage and sewage whereby pyrolysis gases could be generated and burned along with the dried left over wastes, largely carbon, to create a heat source of enormous potential.

A variation of this design locates the melting chamber 18A immediately to the rear rather than above the metal holding chamber 18B with the exhaust and draining ports communicating with 18B. This concept is more suited to the melting of uncontaminated metal and has more liquid metal holding capacity for a given size.

Figure 2:
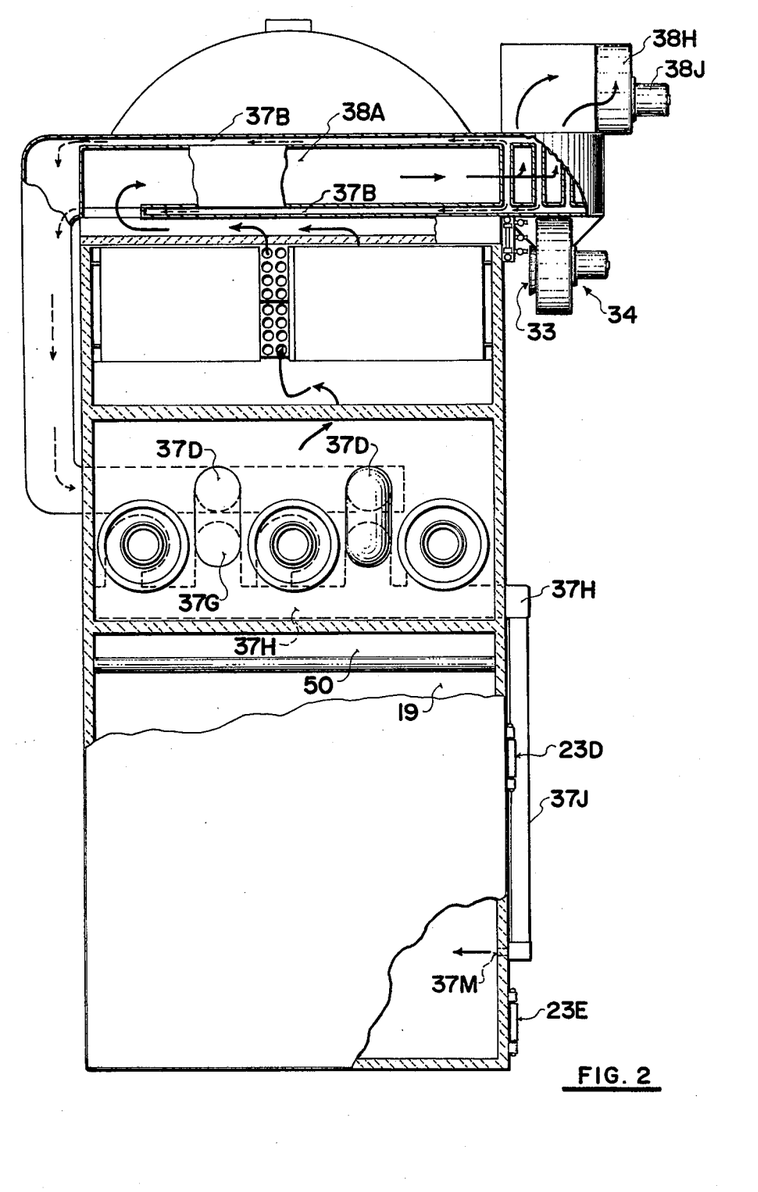
FIG. 2 is a fragmentary vertical section of the steam boiler embodiment.
Figure 2A:
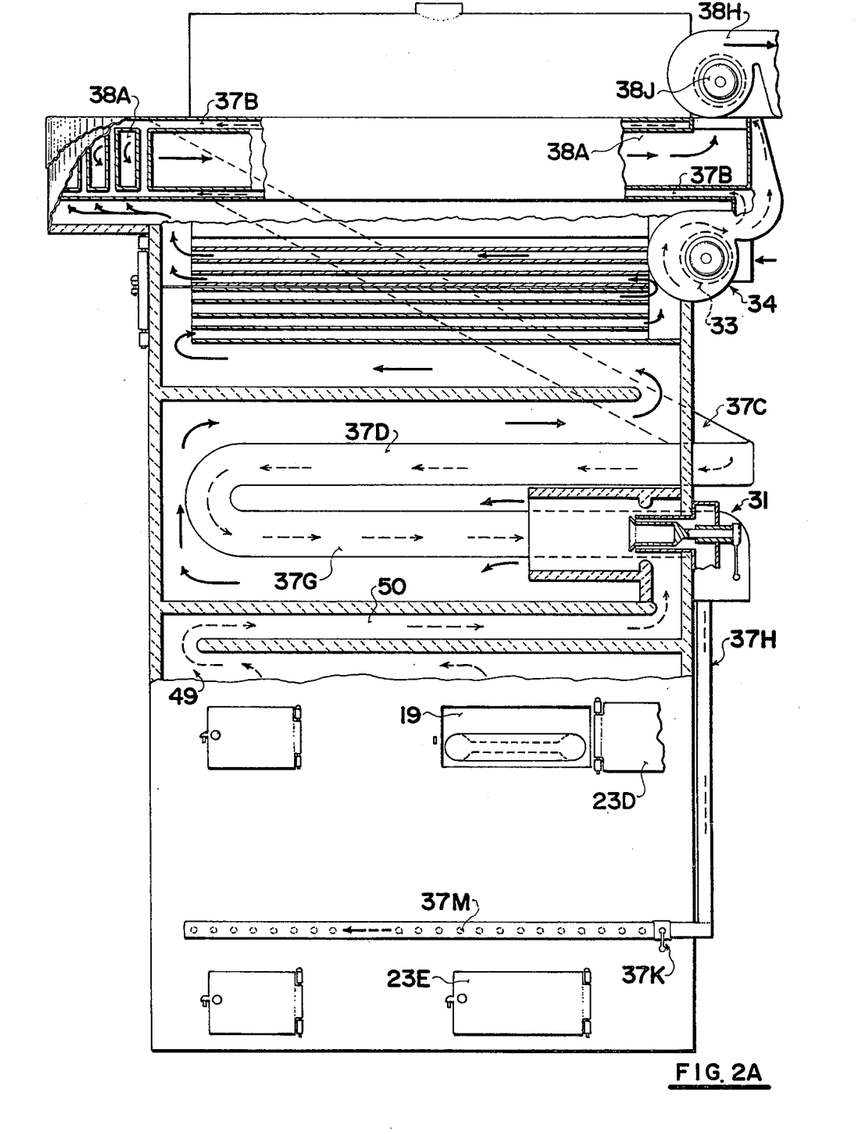
FIG. 2A is a partial cross sectional elevation of FIG. 2.

FIGS. 2 and 2A show an embodiment in which the configuration follows the principles of operation as outlined for the melting furnace previously described with similar numbers being given for all significant components thereof. This is used as a pressurized water heater for processing and space heating primarily from the slow combustion of combustible wastes.

It should also be noted that the device is eminently suitable for use in the treatment of solid, liquid or gaseous (evaporative) waste products which may be introduced into the pyrolysis chamber and subsequently burned in the burner assemblies.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A melting furnace together with a source of burner fuel and comprising in combination a main body, means mounting said body for fore and aft tilting action, vertically situated dividing walls in said body defining the interior thereof into a melt chamber and a combustible gas producing pyrolysis chamber a separate liquid metal holding chamber within said melt chamber, an exhaust gas cleaning chamber, means communicating between said melt chamber and said holding chamber adjacent the front upper side of said holding chamber, a burner assembly for said melt chamber and a further burner assembly for said holding chamber, means operatively connecting said combustible gas producing chamber with said first mentioned burner assembly on a selective basis, exhaust means for said furnace communicating between said melt chamber, said holding chamber and said exhaust gas cleaning chamber, a separate charging door for said melt chamber, and said holding chamber and a metal tapping hole in said holding chamber and selectively communicating through the wall of said main body.

2. The invention according to claim 1 in which said holding chamber includes a floor spanning said melt chamber and defining the melt chamber above said floor and said holding chamber below said floor.

3. The invention according to claim 1 in which said exhaust means includes at least one duct communicating with said melt chamber adjacent the upper side thereof and extending into said holding chamber, a further duct communicating with said holding chamber, an exhaust fan, means operatively connecting said further duct to said exhaust fan, a source of air for said burners and heat exchanger means between said source of air and said means operatively connecting said further duct to said exhaust fan.

4. The invention according to claim 2 in which said exhaust means includes at least one duct communicating with said melt chamber adjacent the upper side thereof and extending into said holding chamber, a further duct communicating with said holding chamber, an exhaust fan, means operatively connecting said further duct to said exhaust fan, a source of air for said burners and heat exchanger means between said source of air and said means operatively connecting said further duct to said exhaust fan.

5. The invention according to claim 1 in which said means operatively connecting said combustible gas producing chamber with said first mentioned burner includes a combustible gas outlet adjacent the upper side of said combustible gas producing chamber, a duct connected to said outlet, said duct extending to said first mentioned burner and being operatively connected thereto to transfer combustible gases from the said combustible gas producing chamber to said burner.

6. The invention according to claim 2 in which said means operatively connecting said combustible gas producing chamber with said first mentioned burner includes a combustible gas outlet adjacent the upper side of said combustible gas producing chamber, a duct connected to said outlet, said duct extending to said first mentioned burner and being operatively connected thereto to transfer combustible gases from the said combustible gas producing chamber to said burner.

7. The invention according to claim 3 in which said means operatively connecting said combustible gas producing chamber with said first mentioned burner includes a combustible gas outlet adjacent the upper side of said combustible gas producing chamber, a duct connected to said outlet, said duct extending to said first mentioned burner and being operatively connected thereto to transfer combustible gases from the said combustible gas producing chamber to said burner.

8. The invention according to claim 4 in which said means operatively connecting said combustible gas producing chamber with said first mentioned burner includes a combustible gas outlet adjacent the upper side of said combustible gas producing chamber, a duct connected to said outlet, said duct extending to said first mentioned burner and being operatively connected thereto to transfer combustible gases from the said combustible gas producing chamber to said burner.

9. The invention according to claim 1 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

10. The invention according to claim 2 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

11. The invention according to claim 3 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

12. The invention according to claim 4 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

13. The invention according to claim 5 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

14. The invention according to claim 6 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

15. The invention according to claim 7 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

16. The invention according to claim 8 in which said first burner assembly includes a substantially annular body, an annular air intake duct partially surrounding the rear end of said body eccentric thereto and communicating therewith to form a venturi air inlet, a fuel inlet valve communicating with said annular air intake duct, a rear burner retort in said body forwardly of said air intake duct, a front burner retort forward of said rear burner retort, a duct connecting said retorts, said means operatively connecting said combustible gas producing chamber with said burner connecting to said duct between said retorts and means to adjust the fuel and air intake volume into said rear burner retort.

17. The invention according to claim 3 in which said exhaust fan includes means to vary the speed thereof selectively, whereby the air pressure within said melt chamber and said holding chamber can be controlled relative to ambient air pressure.

18. The invention according to claim 7 in which said exhaust fan includes means to vary the speed thereof selectively, whereby the air pressure within said melt chamber and said holding chamber can be controlled relative to ambient air pressure.

19. The invention according to claim 1 in which said means communicating between said melt chamber and said holding chamber provides molten metal communication therebetween and also heat transfer therebetween.

20. The invention according to claim 3 in which said means communicating between said melt chamber and said holding chamber provides molten metal communication therebetween and also heat transfer therebetween.

21. The invention according to claim 17 in which said means communicating between said melt chamber and said holding chamber provides molten metal communication therebetween and also heat transfer therebetween.

22. The invention according to claim 3 in which said heat exchanger means includes a plurality of exhaust gas conveying ducts extending between said further duct and said exhaust fan and a plurality of air ducts partially surrounding said exhaust gas conveying ducts and in heat exchange relationship therewith.

23. The invention according to claim 4 in which said heat exchanger means includes a plurality of exhaust gas conveying ducts extending between said further duct and said exhaust fan and a plurality of air ducts partially surrounding said exhaust gas conveying ducts and in heat exchange relationship therewith.

24. The invention according to claim 23 which includes further heat exchange means for the air from said source of air, said further heat exchange means including a plurality of air flue ducts contained within said floor spanning said melt chamber, means connecting said air ducts at one end thereof to said air flue ducts, a plurality of further air flue ducts also contained within said floor, means connecting the other ends of said air flue ducts with one end of said further air flue ducts and means connecting the other ends of said further air flue ducts to said burner assemblies.

25. The invention according to claim 7 in which said combustible gas producing pyrolysis chamber includes a charging door, air intake means for said pyrolysis chamber operatively connected with said source of air for said burners, and means to selectively control the amount of air entering said pyrolysis chamber to control the pyrolysis process therewithin.

* * * * *